(12) United States Patent
Bert

(10) Patent No.: US 9,079,562 B2
(45) Date of Patent: Jul. 14, 2015

(54) ACTIVE-ACTIVE FAILOVER FOR A DIRECT-ATTACHED STORAGE SYSTEM

(75) Inventor: Luca Bert, Cumming, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 426 days.

(21) Appl. No.: 13/062,298

(22) PCT Filed: Nov. 13, 2008

(86) PCT No.: PCT/US2008/083332
§ 371 (c)(1),
(2), (4) Date: Mar. 4, 2011

(87) PCT Pub. No.: WO2009/011769
PCT Pub. Date: Jan. 22, 2009

(65) Prior Publication Data
US 2011/0169254 A1    Jul. 14, 2011

(51) Int. Cl.
*G06F 11/00* (2006.01)
*B60R 21/264* (2006.01)
*C06B 23/02* (2006.01)
*C06D 5/06* (2006.01)

(52) U.S. Cl.
CPC ............. *B60R 21/2644* (2013.01); *C06B 23/02* (2013.01); *C06D 5/06* (2013.01)

(58) Field of Classification Search
USPC ................... 714/4.11, 4.1, 6.1, 6.2
See application file for complete search history.

(56) References Cited

U.S. PATENT DOCUMENTS

| | | | |
|---|---|---|---|
| 2004/0172574 A1 | 9/2004 | Wing et al. | |
| 2005/0021605 A1* | 1/2005 | Davies et al. | 709/203 |
| 2007/0162592 A1* | 7/2007 | Marks et al. | 709/224 |
| 2007/0168476 A1* | 7/2007 | Davies et al. | 709/220 |
| 2007/0168711 A1* | 7/2007 | Chen | 714/11 |
| 2009/0083484 A1* | 3/2009 | Basham et al. | 711/114 |
| 2012/0284435 A1* | 11/2012 | Myrah et al. | 710/74 |

* cited by examiner

*Primary Examiner* — Sarai Butler
(74) *Attorney, Agent, or Firm* — John M. Harman; Daniel J. Santos; Smith Risley Tempel Santos LLC

(57) ABSTRACT

Providing active-active failover capability to non-failover capable direct-attached storage (DAS) servers including connecting a first and a second non-failover capable direct-attached storage (DAS) servers to a shared storage pool via an expander that supports storage zoning, configuring a first storage zone including the first DAS server and a first portion of the shared storage pool, configuring a second storage zone including the second DAS server and a second portion of the shared storage pool, detecting that the second DAS server has failed, zoning out the second portion of the shared storage pool and mapping the second portion of the shared storage pool to the first storage zone.

17 Claims, 6 Drawing Sheets

ACTIVE-ACTIVE FAILOVER FOR A DIRECT-ATTACHED STORAGE SYSTEM

FIELD OF THE INVENTION

The invention generally relates to storage systems and, more particularly, to direct-attached storage systems.

BACKGROUND

Computer networks for use in a business environment continue to require more storage. Typically, such enterprises employ a centralized data storage system, and the computer network includes various personal computers, laptops, etc. that communicate over the network with the data storage system. The data storage system typically includes one or more servers that control the storage of information on and the retrieval of information from dedicated data storage resources, such as hard disk drives, magnetic or optical disks. As the demand for storage continues to increase, the storage capacity of the centralized storage system is becoming larger and larger, and the systems are becoming more and more complex and costly to operate. The complexity and costs are increased by the additional requirement for redundant storage capabilities.

Some enterprises have migrated storage resources to a storage area network (SAN). A SAN is a specialized, high-speed computer network that is typically used to attach computer systems or servers (commonly referred to as "hosts") with little or no local storage to back-end storage devices that provide the bulk of storage and the shared storage. The primary purpose of the SAN is to transfer data between the hosts and the storage devices. A SAN typically includes a communication infrastructure that provides physical connections and a management layer that organizes the connections, storage elements, and computer systems, so that data transfer is secure and robust. SANs are typically, although not necessarily, identified with block input/output (I/O) services. SANs provide an alternative to traditional dedicated connections between servers and local storage elements, as well as any restrictions to the amount of data that a server may access. Instead, a SAN provides the flexibility of networking to enable one server or many heterogeneous servers to share a common storage unit, which may include a storage controller and many storage devices, such as, for example, disk, tape, optical, or other storage devices or systems. Despite the advantages of SAN-based solutions, they remain prohibitively expensive for many smaller enterprises or in small exchange deployments.

Another storage solution involves Direct Attached Storage (DAS) in which all the storage is seen as local by each server and is under the direct control of storage controllers integrated with the servers. The storage may be physically inside the server or outside the server or any combination of the two, but the critical distinction of a DAS system is that the controller of such storage is seen as local for each server and is not shared with other servers. The main advantage of this approach is that its cost is significantly lower than a SAN, at least for small configurations. However, the DAS approach also has disadvantages. For instance, the main limitation is that the storage is only local and cannot be shared across servers, thus creating major limitations in terms of fault tolerance. If a server dies, all its storage dies with it and there is no way to access the data any longer. In contrast, the SAN approach allows the same data to be accessed by other servers that can provide (at a high cost) a convenient failover mechanism.

Despite the many advantages and the commercial success of redundant storage systems and SAN-based storage solutions, there remains a need in the art for more cost-effective redundant storage systems.

SUMMARY

Various embodiments of systems, methods, computer systems, and computer programs are disclosed for providing active-active failover capability to non-failover capable direct-attached storage (DAS) servers. One embodiment is a direct-attached storage (DAS) system including: a first DAS server including a first storage controller; a second DAS server including a second storage controller, the second DAS server in communication with the first DAS server via a local interface; and a zone expander device associated with at least one of the first DAS server and second DAS server, the zone expander device adapted to connect the first and second DAS servers to a first storage device and a second storage device, the zone expander device including a zone configuration module adapted to configure a first storage zone including the first DAS server and the first storage device and a second storage zone including the second DAS server and the second storage device; wherein the first DAS server further includes an active-active failover module adapted to: detect the failure of the second DAS server; disable the second storage zone; and add the second storage device to the first storage zone.

Another embodiment is a method for providing active-active failover capability to non-failover capable direct-attached storage (DAS) servers. One such method includes: connecting a first and a second non-failover capable direct-attached storage (DAS) server; directly connecting the first and second DAS servers to a shared storage pool via an expander that supports storage zoning; configuring a first storage zone including the first DAS server and a first portion of the shared storage pool; configuring a second storage zone including the second DAS server and a second portion of the shared storage pool; detecting that the second DAS server has failed; zoning out the second portion of the shared storage pool; and mapping the second portion of the shared storage pool to the first storage zone.

Yet another embodiment includes a computer program for providing active-active failover capability to non-failover capable direct-attached storage (DAS) servers directly attached to a plurality of storage devices via a zone expander. One such computer program embodied in a computer readable medium and executable by a processor includes logic configured to: configure a first storage zone including a first DAS server and a first portion of the storage devices; configure a second storage zone including the second DAS server and a second portion of the storage devices; detect the failure of the second DAS server; zone out the second storage zone; and map the second portion of the storage devices to the first storage zone.

DETAILED DESCRIPTION

Figure 1:
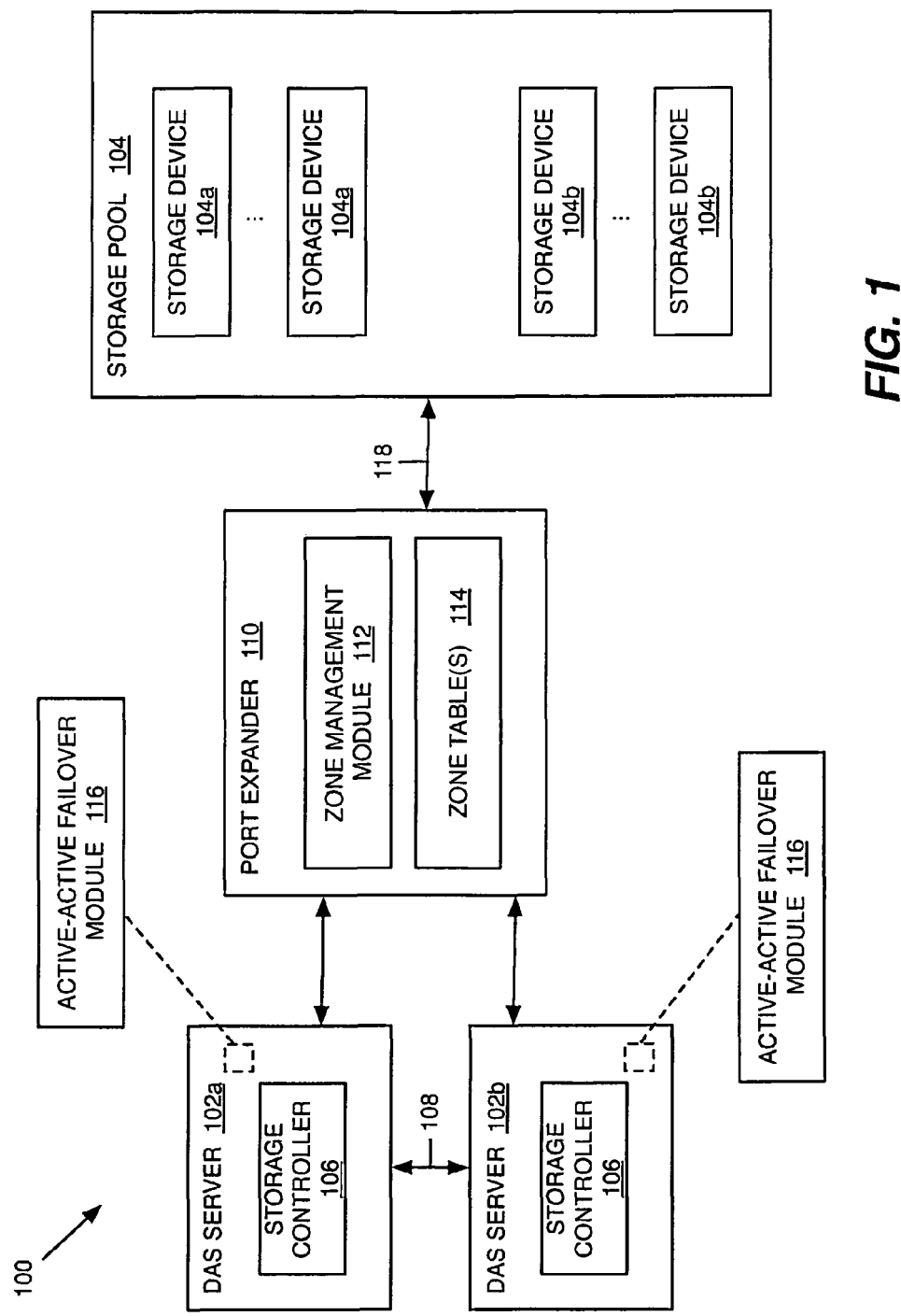
FIG. 1 is a block diagram illustrating an embodiment of a direct-attached storage (DAS) system with active-active failover capability.

FIG. 1 illustrates an embodiment of a direct-attached storage (DAS) system 100 for implementing various embodiments of an active-active failover functionality. The DAS system 100 generally includes one or more DAS servers 102 directly attached to a shared storage pool 104 via a port expander 110. In general, the active-active failover functionality enables one DAS server 102 to take over the storage services of another DAS server 102 in the event of server failure and, when the failed server returns to service, to return the storage services to the previously-failed DAS server 102. As described in more detail below, the active-active failover functionality provides a redundant storage mechanism for enabling one of the DAS servers 102 to take over the storage tasks of another DAS server 102 in the event of a system failure. In an embodiment, the active-active failover functionality is at least partially implemented by manipulating a storage zoning feature provided by the port expander 110 and/or the storage controller(s) 106. The storage controller(s) 106 and/or the port expander 110 may be integrated with the DAS server(s) 102 or provided as an external device connected to the DAS server 102. It should be appreciated that in some embodiments certain aspects of the storage controllers 106 and/or the port expander 110 may be integrated with the storage devices 104.

In general, the storage controllers 106 include a processing device for managing the physical storage on associated storage devices 104 and presenting the storage as logical units. The storage devices 104 may include any suitable storage means, such as, for example, disk systems (e.g., Just a Bunch of Disks (JBOD), Redundant Array of Independent Disks (RAID), etc.), optical systems, or tape systems (e.g., tape drives, tape autoloaders, tape libraries). The storage controller(s) 106 operate in association with the port expander 110 to directly connect the DAS servers 102 to corresponding portions of the storage pool 104. The connection between the DAS servers 102 and the storage pool 104 is represented by the connection 118. The connection 118 includes any non-networked connection by which the storage pool 104 or other digital storage system is connected to the DAS servers 102 without a storage network in between. The connection 118 may include any desirable physical connection(s) or configurations and may support any suitable data transfer technology, physical interfaces or communication protocols.

In an embodiment, the connection 118 and the components and/or interfaces in the DAS system 100 may be configured to support one or more of the Small Computer System Interface (SCSI) standards. One of ordinary skill in the art will appreciate that the DAS system 100 may implement any other suitable data transfer technology. For example, an exemplary working environment supports the Serial Attached SCSI (SAS) data transfer technology. In such embodiments, the port expander 110 may include a SAS expander. In general, the port expander 110 includes a component used to facilitate communication between large numbers of storage devices 104 and DAS servers 102. A SAS expander is a device that may create communication paths between any connection (i.e., a port) attached to it. The name "expander" is due to the fact that, in an embodiment, a common usage is to create communication paths between a small number of server (or "host") ports and devices (or "disk") ports, thus actually "expanding" the host connectivity to devices. Some types of expanders include a feature called "zoning" that allows a user to configure which ports connect to which others. This is a key feature to protect data path security and the "zones" described below. It should be appreciated, however, that in an embodiment the zoning feature may be implemented with an activation matrix of all possible ports and the user can program (e.g., either through boot code or on line) for each port whether it can connect with any other. The ports that are connected (i.e., zoned-in) do not require knowledge that there is an expander in between. It is just like a "wire" connecting them in the sense that the ones that are not connected (i.e., zoned-out) have no way to even know there are other ports.

Referring to FIG. 1, the DAS servers 102 may include an active-active failover module 116, which may be integrated with the storage controller 106 or otherwise integrated with the DAS server 102. As described below in more detail, the active-active failover module 116 may be configured to detect the failure of one of the DAS servers 102 and then command the port expander (e.g., through the storage controller 106) to reprogram storage zones defined in the zone tables 114 during the failover and failback processes. In this regard, the active-active failover module 116 is configured to communicate with the port expander. The port expander 110 includes several components that combine with the active-active failover module 116 for implementing the active-active failover functionality by manipulating the zone capability: a zone management module 112; and one or more data structures for storing zoning information (e.g., zone table 114). It should be appreciated that the zone management module 112 and the active-active failover module 116 in the DAS servers 102 include the logic for providing certain functions associated with the active-active failover and failback processes. Although illustrated in FIG. 1 as separate modules, the modules may include multiple modules and in certain embodiments the associated logic may be combined into one or more associated modules. One or ordinary skill in the art will appreciate that these components may be implemented in software, hardware, firmware, or any combination thereof. In certain embodiments, the module(s) may be implemented in software or firmware that is stored in a memory and that is executed by the storage controllers 106 or any other processor(s) or suitable instruction execution system.

One of ordinary skill in the art will appreciate that any process or method descriptions associated with the operation of the modules 112, 114 and 16 (or any other modules associated with the DAS system 100) may represent modules, segments, logic or portions of code which include one or more executable instructions for implementing logical functions or steps in the process. It should be further appreciated that any logical functions may be executed out of order from that described, including substantially concurrently or in reverse order, depending on the functionality involved, as would be understood by those reasonably skilled in the art. Furthermore, the modules may be embodied in any computer readable medium for use by or in connection with an instruction execution system, apparatus, or device, such as a computer-based system, processor-containing system, or other system that can fetch the instructions from the instruction execution system, apparatus, or device and execute the instructions.

In general, the zone management module 112 includes the logic for configuring storage zones. As mentioned above, a storage zone is used to define which portions of the storage pool 104 are to be served by any particular DAS server 102. For example, referring to FIG. 3, a storage zone A may define a first storage system A including the DAS server 102a and storage device(s) 104a being served by the DAS server 102a, while a second storage zone B may define a second storage system B including the DAS server 102b and storage device(s) 104b being served by the DAS server 102b. Various storage systems may be defined using any desirable zoning configurations. For purposes of illustrating the operation of the active-active failover functionality, the remaining description will use the simplified two-zone configuration including zones A and B to describe the operation of the active-active failover functionality, although it should be appreciated that any number of zones (M) and any number of DAS servers (N) may provide an N-way failover mechanism on M zones. It should be further appreciated that the active-active failover module 116 in the DAS servers 102 generally includes the logic for implementing a failover and a failback process, as described below.

Figure 2:
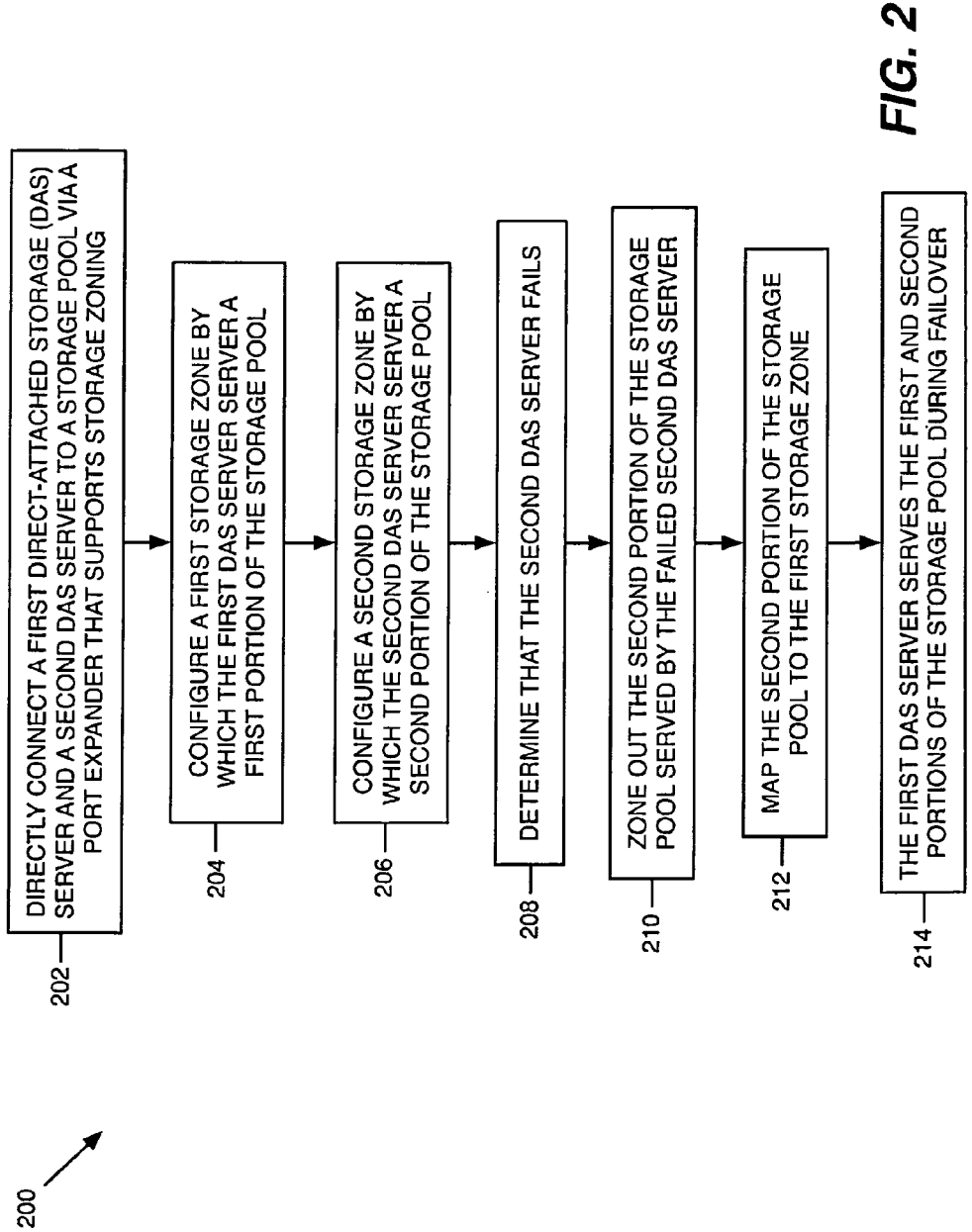
FIG. 2 is a flow chart illustrating certain aspects of an embodiment of an active-active failover method associated with the operation of the DAS system of FIG. 1.
Figure 3:
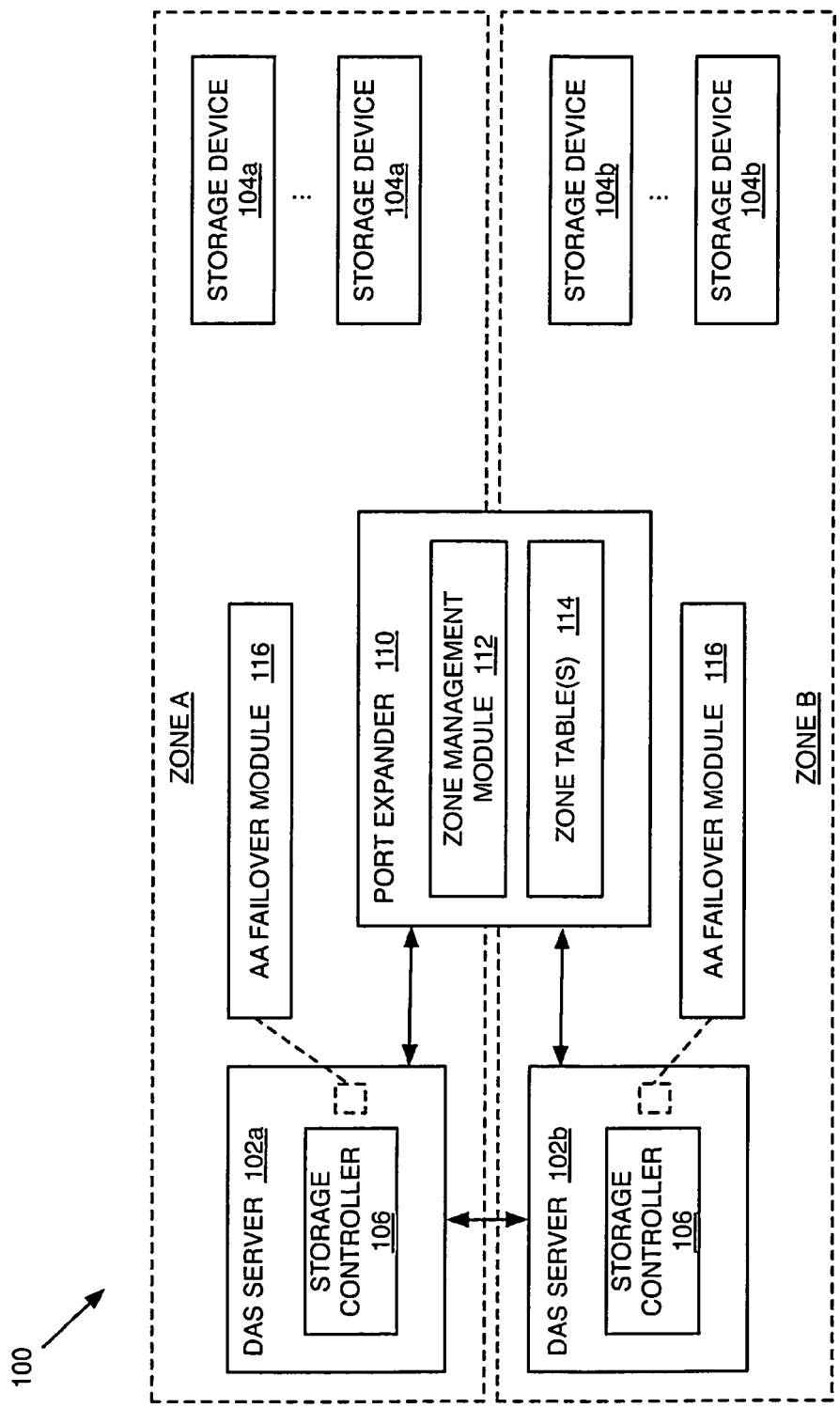
FIG. 3 illustrates an exemplary zoning configuration for the DAS system of FIG. 1.
Figure 4:
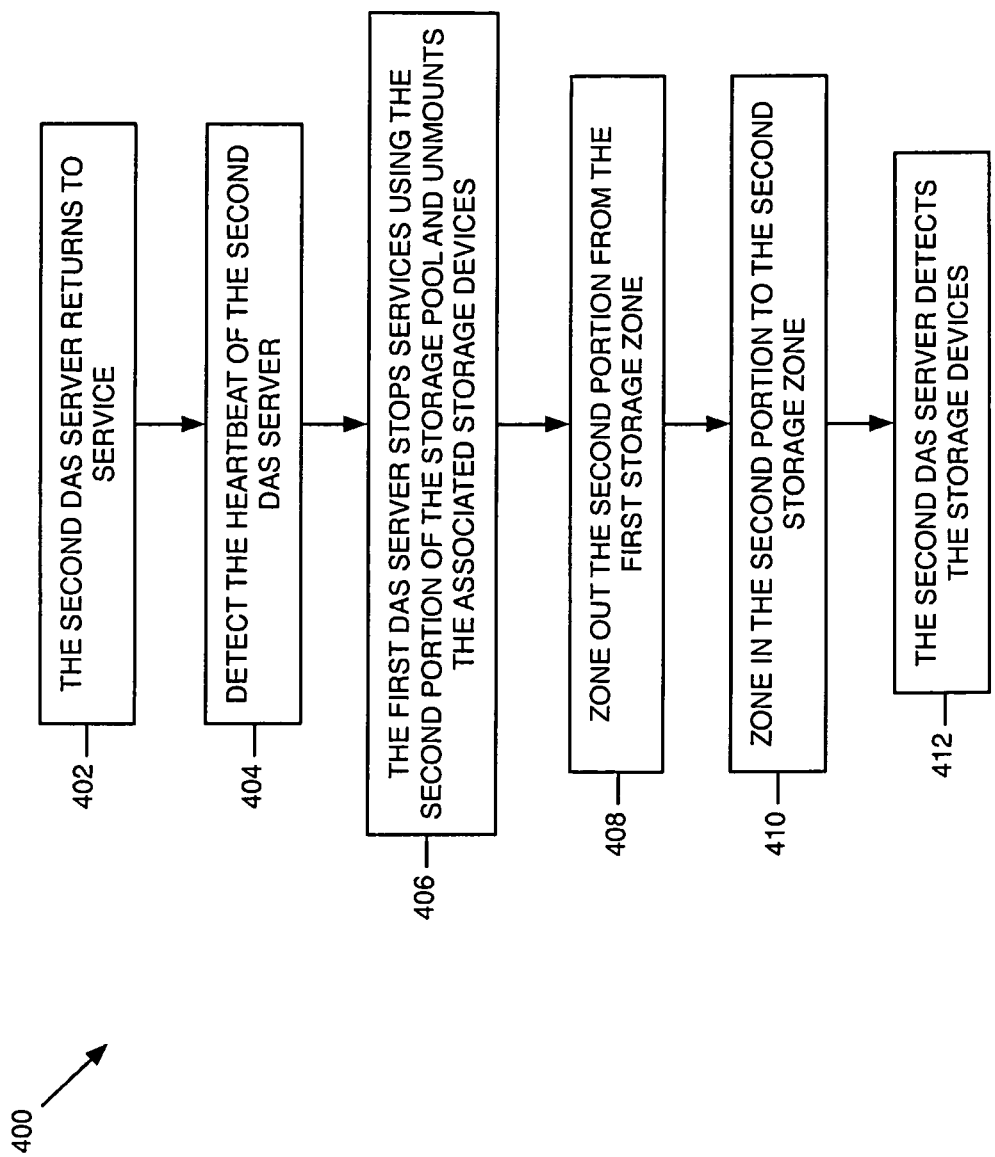
FIG. 4 is a flow chart illustrating additional aspects of another embodiment of an active-active failover method associated with the operation of the DAS system of FIG. 1.
Figure 5:
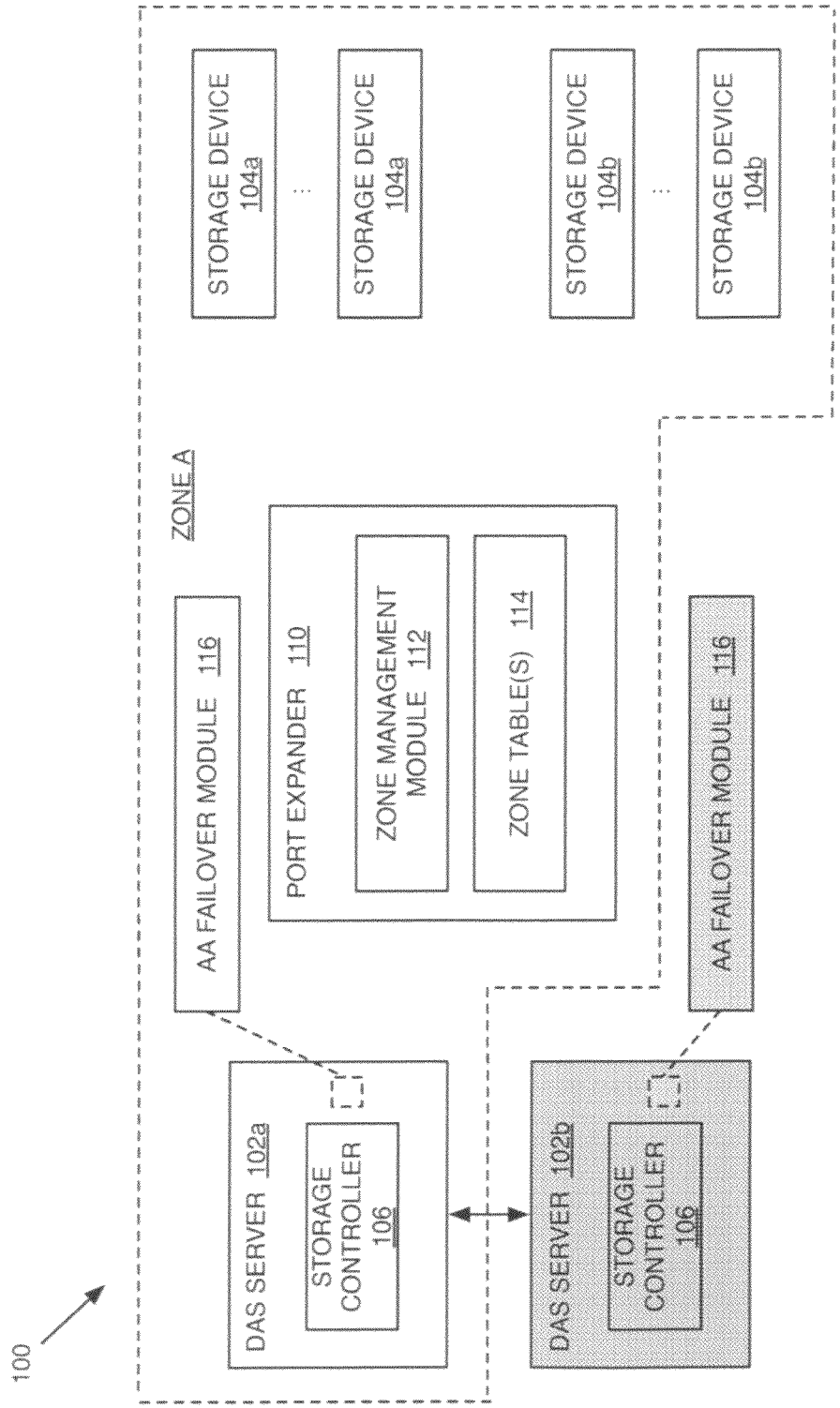
FIG. 5 illustrates the DAS system of FIG. 4 during a failover mode.

The operation of various embodiments of methods for implementing an active-active failover functionality using a zoning feature provided by the port expander 110 are described below with respect to FIGS. 2-5. FIGS. 2, 3 and 5 generally illustrate a zone configuration and failover process. FIG. 4 generally illustrates a failback process.

Referring to the method 200 of FIG. 2, at block 202, the DAS servers 102a and 102b are directly connected (i.e., connection 118) to the storage pool 104 via the port expander 110, which supports zoning capability. At blocks 204 and 206, the DAS system 100 configures two or more storage zones in any conventional or other manner. As illustrated in FIG. 3, a first storage zone A may be configured to define the DAS server 102a and associated storage devices 104a to be served by the DAS server 102a. A second storage zone B may be configured to define the DAS server 102b and associated storage devices 104b to be served by the DAS server 102b. Although the DAS servers 102a and 102b may be configured to share the storage pool 104, in an embodiment in which the storage controllers 106 are implemented as RAID controllers, the storage zones may be constrained, for example, such that the DAS servers 102a and 102b each have a statically assigned virtual disk and each virtual disk in the DAS system 100 cannot be shared or accessed by multiple DAS servers 102 at any time. In other non-RAID embodiments, this constraint may be reduced, altered, or removed.

After the DAS system 100 is configured and operating according to the zones, at block 208, the DAS system 100 determines that one of the active DAS servers 102 has failed. Failure detection may be implemented in any suitable fashion. In an embodiment, the DAS servers 102 may be connected via a local interface (FIG. 1), in which case a heartbeat or a ping mechanism may be used to detect server failure. In an embodiment, a heartbeat over a local area network (LAN) may be used. Other embodiments may use, for example, a backend heartbeat over SAS, or perhaps a shared management tool that controls the system gets notified through various mechanisms, such as, service consoles, etc. In this example, the DAS server 102b represents the failed server. At block 210, the storage devices 104b being served by the DAS server 102b are zoned out. The zone-out may be controlled by the active-active failover module 116 in communication with the port expander 110 (e.g., either pass-through the storage controller 106 or sideband). At block 212, the storage devices 104b are mapped to an active zone-zone A in this example. It should be appreciated that the port expander 110 controls the zones based on internal configuration tables (e.g., tables 114).

The initial mapping may be done by boot code or a system console that creates the basic configurations with the proper zones. In the case of a failover, the surviving DAS controller may overwrite the zones excluding the dead controller port and adding the device ports to its own zone map. In the case of failback, the surviving controller may zone out the disk ports to be returned to the revived DAS server and zone in the other DAS server. There are various ways to implementing the zone mapping. In a RAID-based embodiment, for example, the RAID controller will see a set of foreign disks showing up to the disk ports. The active-active failover module 116 may communicate to the controller to import the foreign disks and then expose the configuration to the DAS server. In this manner, as represented by block 214 and illustrated in FIG. 5, after the failover process is complete the DAS server 102a serves both storage devices 104a and 104b.

Referring to the method 400 of FIG. 4, at blocks 402 and 404, the failback process may be initiated upon detecting that the previously-failed server (i.e., DAS server 102b) has returned to service. Again, this may be accomplished via a heartbeat or ping, or other, mechanism. At block 406, the DAS server 102a may terminate services associated with storage devices 104b so they can be prepared for failback. At block 408, the DAS system 100 zones out the storage devices 104b from zone A. At block 410, the DAS system 100 zones in the storage devices 104b in connection with zone B. As described above, the zoning information may be managed via zone table(s) 114. At block 412, the reactivated DAS server 102b may detect storage devices 104b and resume operation.

Figure 6:
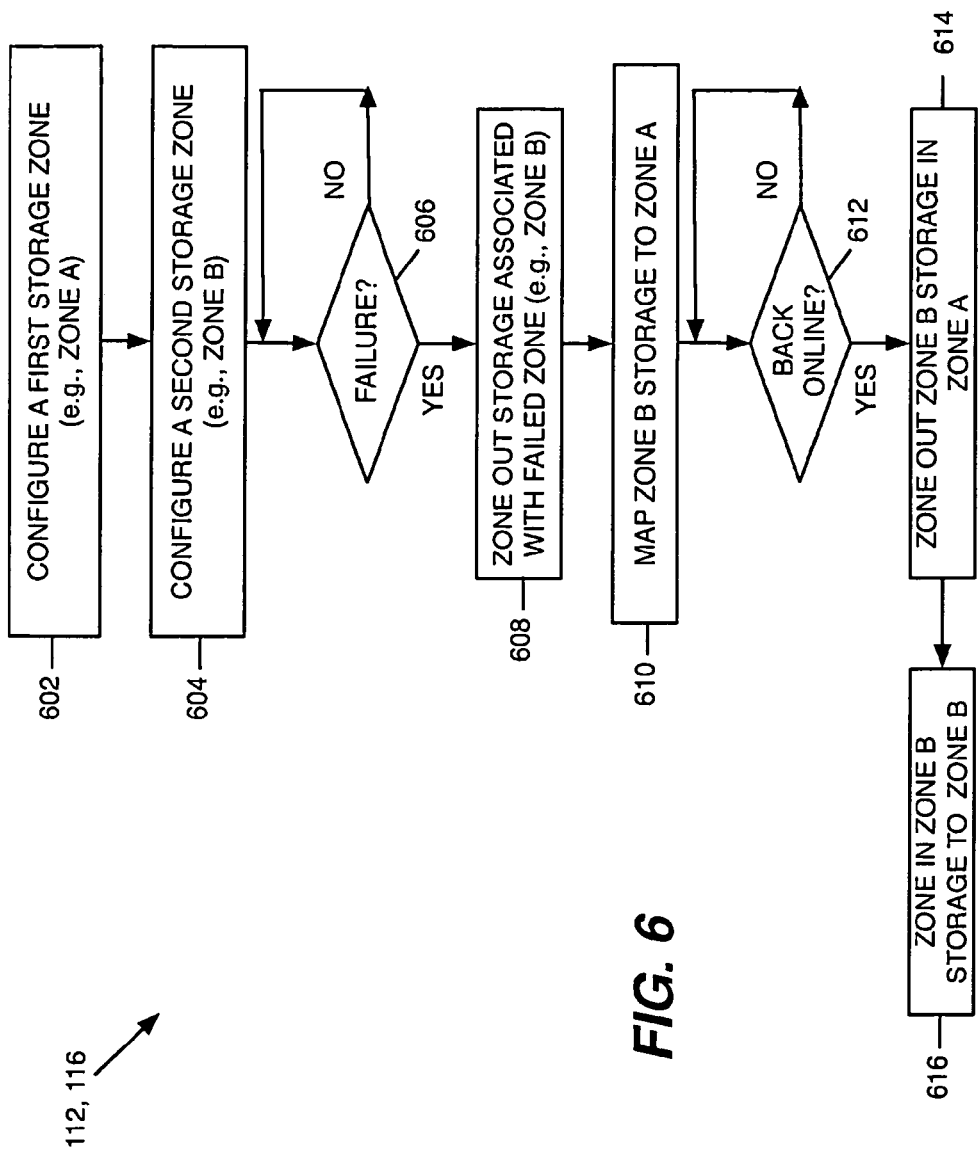
FIG. 6 is a flow chart illustrating the architecture, operation, and/or functionality of an embodiment of the zone management and/or active-active failover modules of FIG. 1.

FIG. 6 is a flowchart illustrating the architecture, operation, and/or functionality of an embodiment of the zone management module 112 and active-active failover module 116. At blocks 602 and 604, the zone management module 112 configures the storage zones as desired. The zone management module 112 may be configured to enable a user of the DAS servers 102 (or other computer system) to manually configure the storage zones. At decision block 606, the active-active failover module 116 detects the failure of a DAS server 102b. At blocks 608 and 610, the active-active failover module 116 zones out the storage devices 104b from zone B and maps them to zone A. The active-active failover module 116 monitors the DAS system 100 to determine when the failed DAS server 102b is back online (decision block 612). When the failed DAS server 102b returns to service, at blocks 614 and 616 the active-active failover module 116 zones out storage devices 104b from zone A and zones in storage devices 104b to zone B.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

The invention claimed is:

1. A direct-attached storage (DAS) system comprising:
a first DAS server comprising a first storage controller;
a second DAS server comprising a second storage controller, the second DAS server in communication with the first DAS server via a local interface; and
a zone expander device associated with at least one of the first DAS server and second DAS server, the zone expander device adapted to connect the first and second DAS servers to a first storage device and a second storage device, the zone expander device comprising a zone configuration module adapted to configure a first storage zone comprising the first DAS server and the first storage device and a second storage zone comprising the second DAS server and the second storage device;

wherein the first DAS server further comprises an active-active failover module communicating with the zone expander device, wherein the zone expander device includes components that combine with the active-active failover module for implementing the active-active failover functionality by manipulating the zone capability, the active-active failover module adapted to:

detect the failure of the second DAS server;

disable the second storage zone; and add the second storage device to the first storage zone.

2. The DAS system of claim 1, wherein the first and second storage devices comprise a Redundant Array Independent Disks (RAID) controller.

3. The DAS system of claim 1, wherein the zone expander device supports a Small Computer System Interface (SCSI) standard.

4. The DAS system of claim 3, wherein the zone expander comprises a Serial Attached SCSI (SAS) expander.

5. The DAS system of claim 1, wherein the zone expander device comprises an external switch unit.

6. The DAS system of claim 1, wherein the zone expander device is integrated with at least one of the first and second storage controllers.

7. The DAS system of claim 1, wherein the zone expander device is integrated with at least one of the first and second storage devices.

8. The DAS system of claim 1, wherein the zone expander device is an external device coupled to at least one of the first and second storage devices.

9. The DAS system of claim 1, wherein the active-active failover module is further adapted to:

detect that the second DAS server is back in service;

remove the second storage device from the first storage zone; and enable the second storage zone.

10. A method for providing active-active failover capability to non-failover capable direct-attached storage (DAS) servers, the method comprising:

connecting a first and a second non-failover capable direct-attached storage (DAS) server;

directly connecting the first and second DAS servers to a shared storage pool via an expander that supports storage zoning;

configuring a first storage zone comprising the first DAS server and a first portion of the shared storage pool;

configuring a second storage zone comprising the second DAS server and a second portion of the shared storage pool;

detecting that the second DAS server has failed;

zoning out the second portion of the shared storage pool; and mapping the second portion of the shared storage pool to the first storage zone, wherein the expander includes components that combine with an active-active failover module in the first DAS server for implementing the active-active failover functionality by manipulating the zone capability.

11. The method of claim 10, wherein the first and second DAS servers implement a Small Computer System Interface (SCSI) standard.

12. The method of claim 11, wherein the expander comprises a Serial Attached SCSI (SAS) expander.

13. The method of claim 10, further comprising:

detecting that the second DAS server is back in service;

zoning out the second portion of the shared storage pool;

mapping the second portion of the shared storage pool to the second storage zone.

14. A computer program for providing active-active failover capability to non-failover capable direct-attached storage (DAS) servers directly attached to a plurality of storage devices via a zone expander, the computer program embodied in a computer readable medium and executable by a processor, the computer program comprising logic configured to:

configure a first storage zone comprising a first DAS server and a first portion of the storage devices;

configure a second storage zone comprising the second DAS server and a second portion of the storage devices;

detect the failure of the second DAS server;

zone out the second storage zone; and map the second portion of the storage devices to the first storage zone, wherein the expander includes components that combine with an active-active failover module in the first DAS server for implementing the active-active failover functionality by manipulating the zone capability.

15. The computer program of claim 14, wherein at least a portion of the logic is integrated with a storage controller associated with at least one of the first and second DAS servers.

16. The computer program of claim 14, wherein at least a portion of the logic is integrated with the zone expander.

17. The computer program of claim 14, further comprising logic configured to:

detect that the second DAS server is back in service;

zone out the second portion of the storage devices;

map the second portion of the storage devices to the second storage zone.

* * * * *